United States Patent
Sakai

(10) Patent No.: US 10,446,954 B2
(45) Date of Patent: Oct. 15, 2019

(54) GROUND TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tatsurou Sakai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/069,031

(22) PCT Filed: Feb. 6, 2017

(86) PCT No.: PCT/JP2017/004268
§ 371 (c)(1),
(2) Date: Jul. 10, 2018

(87) PCT Pub. No.: WO2017/145729
PCT Pub. Date: Aug. 31, 2017

(65) Prior Publication Data
US 2019/0036244 A1    Jan. 31, 2019

(30) Foreign Application Priority Data

Feb. 26, 2016 (JP) .................. 2016-036408

(51) Int. Cl.
*H01R 11/12* (2006.01)
*G01L 5/00* (2006.01)
(Continued)

(52) U.S. Cl.
CPC ................ *H01R 11/12* (2013.01); *G01L 5/00* (2013.01); *G01L 5/24* (2013.01); *H01R 4/34* (2013.01); *H01R 4/64* (2013.01); *H01R 2201/26* (2013.01)

(58) Field of Classification Search
CPC .......... H01R 11/12; H01R 4/34; H01R 11/28; H01R 11/287; H01R 2201/26; G01L 5/24; G01L 1/16; F16B 31/02; F16B 31/028
See application file for complete search history.

(56) References Cited

U.S. PATENT DOCUMENTS 3,358,257 A * 12/1967 Brewer ...................... G01L 1/16
                                                  257/417
6,810,747 B2 * 11/2004 Engler ...................... G01L 5/24
                                                  73/761
(Continued)

FOREIGN PATENT DOCUMENTS

JP        01-289075       11/1989
JP        2000-277192     10/2000
(Continued)

OTHER PUBLICATIONS

Official Communication issued in International Bureau of WIPO Patent Application No. PCT/JP2017/004268, dated Apr. 25, 2017.

*Primary Examiner* — Felix O Figueroa
(74) *Attorney, Agent, or Firm* — Greenblum & Bernstein, P.L.C.

(57) ABSTRACT

A ground terminal with a novel structure is provided that enables reliable detection of loosening of a terminal. A ground terminal that is bolted to ground a ground wire of a vehicle-mounted device to a negative terminal of a battery, the ground terminal including: a connection portion that has a bolt insertion hole into which a bolt used for the bolting is (Continued)

inserted. A piezoelectric element is provided surrounding the bolt insertion hole of the connection portion.

3 Claims, 2 Drawing Sheets

(51) Int. Cl.
*H01R 4/34* (2006.01)
*H01R 4/64* (2006.01)
*G01L 5/24* (2006.01)

(56) References Cited

U.S. PATENT DOCUMENTS

| | | | |
|---|---|---|---|
| 7,073,390 B2* | 7/2006 | Luthje | C23C 30/00 |
| | | | 252/62.9 R |
| 7,350,419 B2* | 4/2008 | Luthje | F16B 31/028 |
| | | | 73/761 |
| 7,587,918 B2* | 9/2009 | Imgrut | B30B 15/0094 |
| | | | 72/21.4 |
| 2006/0051180 A1 | 3/2006 | Luthje et al. | |

FOREIGN PATENT DOCUMENTS

| | | |
|---|---|---|
| JP | 2004-147382 | 5/2004 |
| JP | 2005-522688 | 7/2005 |
| JP | 2015-161323 | 9/2015 |
| WO | 2014/208654 | 12/2014 |

* cited by examiner

GROUND TERMINAL

TECHNICAL FIELD

The present invention is related to a ground terminal for grounding a negative terminal of a vehicle-mounted device to a vehicle body or the like, and is particularly related to a ground terminal for which loosening of the ground connection can be detected.

BACKGROUND ART

Conventionally, many electric/electronic devices mounted to a vehicle such as an automobile are grounded to a negative terminal of a battery via the vehicle body by fixing the negative terminals of the devices to a metallic vehicle body (body ground). Such a ground terminal is disclosed in JP H6-60061A (Patent Document 1), for example. Also, in cases where the vehicle body is made of a non-conductive material such as a carbon-fiber reinforced plastic in order to meet such demands as making the vehicle lighter, the negative terminals of the devices and the negative terminal of the battery are sometimes grounded by a wire.

Incidentally, research regarding automatic vehicle driving has grown in recent years. It is important that power failure does not occur in the vehicle, and it is necessary that the grounded state of the ground terminal does not deteriorate over time. Conventionally, ground terminals are bolted at a constant pressure, using a torque wrench.

However, there is an issue with just using a torque wrench to fasten a bolt at a constant pressure in that it cannot be denied that the grounded state of a ground terminal may deteriorate as the bolt loosens over time. Thus, for example, in WO 2014/208654 (Patent Document 2), a terminal provided with a temperature sensor for monitoring the connection state of a terminal by sensing heat generated by the terminal has been proposed. However, even if this terminal is applied to the ground terminal, it is difficult to reliably detect loosening of the terminal because most of the heat escapes via the vehicle body, and it cannot be said that this is a sufficiently desirable measure to take.

CITATION LIST

Patent Document

Patent Document 1: JP H6-60061A
Patent Document 2: WO 2014/208654

SUMMARY OF INVENTION

Technical Problem

The present invention was completed in light of the above-described circumstances, and a resolution to these problems is providing a ground terminal with a novel structure with which loosening of a terminal can be reliably detected.

Solution to Problem

A first aspect of the present invention is a ground terminal that is bolted to ground a ground wire of a vehicle-mounted device to a negative terminal of a battery, the ground terminal including: a connection portion that has a bolt insertion hole into which a bolt used for the bolting is inserted. A piezoelectric element is provided surrounding the bolt insertion hole of the connection portion.

According to this aspect, the piezoelectric element is provided surrounding the bolt insertion hole in the connection portion of the bolted ground terminal. Accordingly, if a fastened bolt were to come loose, a gap forms between the bolt and the piezoelectric element, and large changes in the pressure acting on the piezoelectric element will occur due to vibrations in the vehicle. As a result, when the bolt has become loose, large changes in the voltage generated in the piezoelectric element will occur due to vibrations in the vehicle, and thus loosening of the ground terminal can be reliably detected by detecting such changes in the voltage.

In this way, according to this aspect, because loosening and floating of the ground terminal can be reliably detected, sensor malfunctions caused by loosening and the like of the ground terminal, and major accidents due to sensor malfunctions can be prevented in advance, and vehicle safety can be improved.

Note that, in order to secure insulation between the piezoelectric element and the surrounding members, molding using a synthetic resin material such as silicon (SI), polymide (PI), and epoxy (EP), is performed, for example.

A second aspect of the present invention according to the first aspect is an aspect in which the piezoelectric element is sandwiched between two plates that form the connection portion.

According to this aspect, the piezoelectric element is sandwiched between the two plates that form the connection portion. Accordingly, because the piezoelectric element does not come into direct contact with the bolt, pressure acting on the piezoelectric element can be prevented from concentrating at a specific point, and thus damage to the piezoelectric element can be advantageously avoided.

A third aspect of the present invention according to the second aspect is an aspect in which the first plate of the two plates is provided with an engaging portion that engages with the second plate and holds the piezoelectric element in a sandwiched state.

According to this aspect, the first plate of the two plates is provided with an engaging portion that engages with the second plate and keeps the piezoelectric element in a state of being sandwiched between the two plates. Accordingly, the workability when bolting and fixing the connection portion to the vehicle body can be improved.

A fourth aspect of the present invention according to any one of the first to third aspects is an aspect in which the piezoelectric terminal is provided in an annular shape surrounding the bolt insertion hole.

According to this aspect, the piezoelectric element is provided in an annular shape surrounding the bolt insertion hole. Accordingly, loosening of the bolt can be detected in the entire region surrounding the bolt insertion hole, and thus loosening of the bolt can be detected over a wide range.

A fifth aspect of the present invention according to any one of the first to fourth aspects is an aspect further including a core wire crimping portion that is crimped and fixed to a core wire of the ground wire, and two electrical wires extending from the piezoelectric element and the ground wire are crimped and fixed by the core wire crimping portion.

According to this aspect, two wires extend from the piezoelectric element, and the two wires and the ground wire are crimped and fixed by the core wire crimping portion. Accordingly, the workability when routing the two wires can be improved, and the holdability of the two wires of the piezoelectric element can be effectively improved.

Advantageous Effects of Invention

According to the present invention, a piezoelectric element is provided surrounding the bolt insertion hole of the connection portion of the ground terminal that is bolted. Accordingly, if the fastened bolt were to come loose, a gap will form between the bolt and the piezoelectric element, and large changes in the pressure acting on the piezoelectric element will occur due to vibrations in the vehicle. As a result, large changes in the voltage generated in the piezoelectric element will occur, and thus loosening of the ground terminal can be reliably detected by detecting such changes in the voltage. In this way, because loosening and floating of the ground terminal can be reliably detected, sensor malfunctions caused by loosening and the like of the ground terminal, and major accidents caused by sensor malfunctions can be prevented in advance, and vehicle safety can be improved.

DESCRIPTION OF EMBODIMENTS

An embodiment of the present invention will be described below with reference to the drawings.

Figure 1:
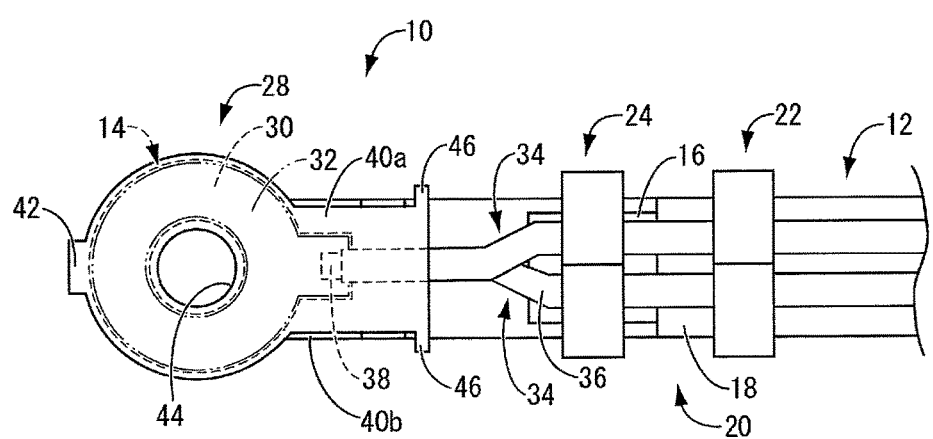
FIG. 1 is a plan view of a ground terminal as an embodiment of the present invention, and shows a state where a ground wire is connected and a piezoelectric element is attached.
Figure 2:
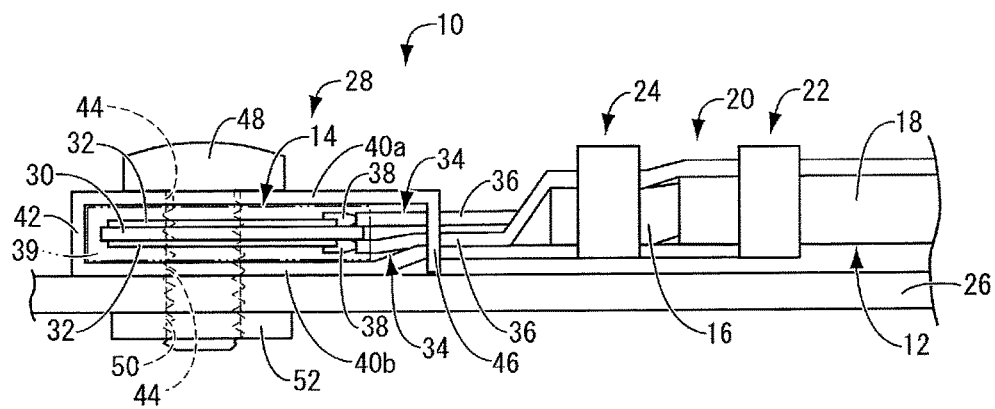
FIG. 2 is a lateral view of the ground terminal shown in FIG. 1, and shows a state where the ground terminal is bolted to a vehicle body.
Figure 3:
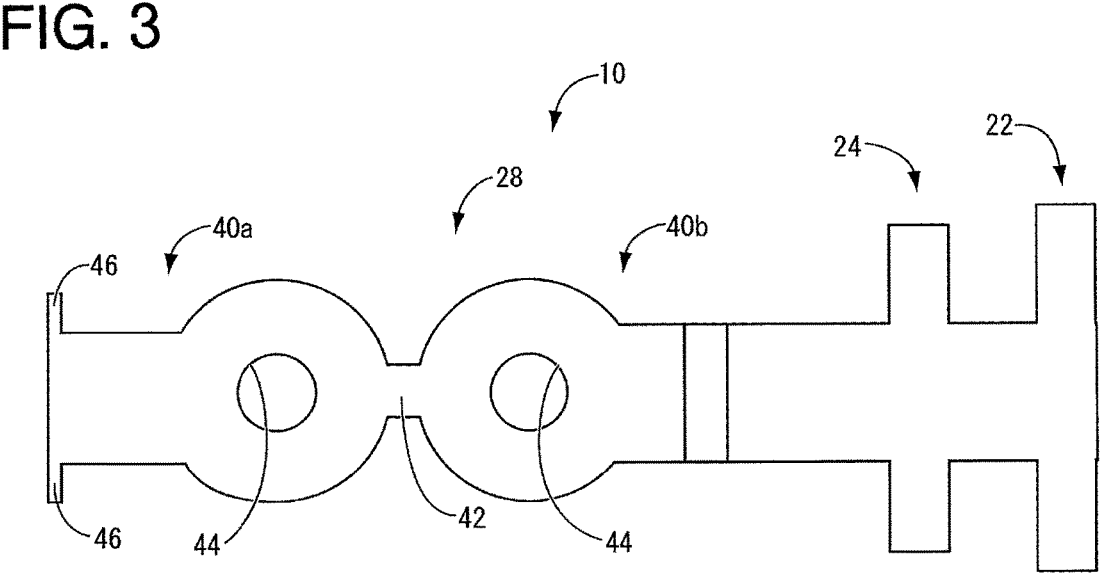
FIG. 3 is an unfolded view of the ground terminal according to the present embodiment.

FIGS. 1 to 3 show a ground terminal 10 as an embodiment of the present invention. The ground terminal 10 is integrally made from a conductive metal, and is used with a ground wire 12 connected and a piezoelectric element 14 attached. Here, the ground wire 12 has a structure in which a core wire 16, which is a conductor and is a plurality of metal strands made of copper, aluminum, or the like that are bound together, is covered with an insulative coating 18 that is made of an ethylene-based resin, a styrene-based resin, or the like and is electrically insulative. More specifically, the ground terminal 10 includes a coating crimping portion 22 that is crimped and fixed to the insulative coating 18 of a wire end 20 of the ground wire 12, a core wire crimping portion 24 that is crimped and fixed to the core wire 16 extending from an end portion of the insulative coating 18, and a connection portion 28 that extends from the core wire crimping portion 24 and is bolted to a vehicle body panel 26. Two wires 34 that extend from the later-described piezoelectric element 14 are also configured to be crimped and fixed by the core wire crimping portion 24 and the coating crimping portion portion 22 along with the ground wire 12. Note that, in the description below, "up" refers to the upward direction in FIG. 2, "down" refers to the downward direction in FIG. 2, "front" refers to the left side in FIGS. 1 and 2, and "rear" refers to the right side in FIGS. 1 and 2.

On the other hand, as shown in FIGS. 1 and 2, the piezoelectric element 14 has a substantially circular flat plate-like shape, and employs a configuration in which metal electrodes 32 are stuck to two sides of a piezoelectric body 30 made of lead zirconate titanate (PZT), which is a piezoelectric ceramic material, for example. Furthermore, core wires 38 that have been exposed by stripping an insulative coating 36 off of terminal ends of the wires 34 are anchored and connected to the electrodes 32 using a suitable known means such as soldering. Then, to secure insulation of the piezoelectric element 14 formed in this manner from other members in the surrounding region, molding is performed so that the entire outer surface of the piezoelectric element 14 including the terminals of the electrical lines 34 is covered with a synthetic resin material such as silicone (SI) or polymide (PI). Note that, for ease of understanding, the electrodes 32 are shown with a phantom line in FIG. 1, and a mold portion 39 that covers the entire outer surface of the piezoelectric element 14 is shown with a phantom line in FIG. 2.

The connection portion 28 of the ground terminal 10 has a structure in which two plates 40a and 40b, which have substantially the same shape in plan view, are coupled to each other by a bending portion 42, and by bending the first plate 40a at the bending portion 42 over the second plate 40b, the piezoelectric element 14 is sandwiched between the two plates 40a and 40b. Both of the plates 40a and 40b have a substantially annular shape on the bending portion 42 side, but have a substantially rectangular shape on their sides away from the bending portion 42, and in the central portion of the regions made into substantially annular regions, substantially circular bolt insertion holes 44 pierce therethrough, the bolt insertion holes 44 being used in later-described bolting where a bolt 48 is passed therethrough. That is to say, the piezoelectric element 14 is provided in an annular shape surrounding the bolt insertion holes 44. Also, an end portion of a substantially rectangular region of the first plate 40a is provided with a pair of engaging portions 46 that protrude outward from both sides thereof in the width direction (vertical direction in FIG. 1), and as a result of folding and engaging the engaging portions 46 with the second plate 40b to sandwich both side edge portions thereof, the piezoelectric element 14 can be held in a sandwiched state between the two plates 40a and 40b. Note that, as shown in FIG. 2, the rear end side (right end side in FIG. 3) of the second plate 40b that is engaged with the engaging portions 46 is lifted up and folded into a crank-like shape when seen from side-on.

A ground terminal 10 with such a structure can be produced using the following method. For example, a metal plate is pressed into the unfolded state shown in FIG. 3. Note that, at this time, the end portion side (right side in FIG. 3) of the substantially rectangular second plate 40b is pressed so as to be lifted upward and take on a substantially crank-like form when seen side-on (see FIGS. 2 and 3). Next, the piezoelectric element 14 is arranged by placing a piezoelectric element body 30 on the second plate 40b, with the two wires 34 extending rearward (right in FIG. 3) from the piezoelectric element 14. Then, the first plate 40a is bent back at the bending portion 42 to position the bolt insertions holes 44 of the two plates 40a and 40b so that they overlap, from above, and is arranged on the piezoelectric element body 30 of the piezoelectric element 14 placed on the second plate 40b. Then, the pair of engaging portions 46 provided on the first plate 40a are engaged with the second plate 40b by sandwiching the two side edge portions in the width direction (vertical direction in FIG. 3) thereof, and as a result, the piezoelectric element 14 can be kept in a sandwiched state by the two plates 40a and 40b (see FIGS. 1 and 2). In this state, the unfolded, that is, the flat plate-like core wire crimping portion 24 is provided on the rear side (right side in FIG. 3) of the second plate 40b included in the connection portion 28, and the unfolded, that is, the flat plate-like covering coating crimping portion 22 is provided further rearward of the core wire crimping portion 24. Next, the insulative coating 18 of the wire end 20 of the ground wire 12 is stripped to expose the core wire 16, the ground wire 12 of the wire end 20 is placed onto the coating crimping portion 22 and the core wire 16 is placed onto the core wire crimping portion 24, and by crimping the coating crimping portion 22 and the core wire crimping portion 24 using a known crimping apparatus in a state where the two wires 34 extending from the piezoelectric element 14 are also placed onto the coating crimping portion 22 and the core wire crimping portion 24, a ground terminal 10 as shown in FIG. 1 is completed, the ground wire 12 being connected and the two wires 34 extending from the piezoelectric element 14 being crimped and fixed by the crimping portions 22 and 24. Lastly, as shown in FIG. 2, the bolt 48 is passed through the bolt insertion holes 44 in the two plates 40a and 40b that form the connection portion 28 of the ground terminal 10, and then the bolt 48 is inserted into a through hole 50 piercing the vehicle body panel 26, which is conductively connected to the negative terminal of an unshown battery, and a nut 52 is screwed thereon. Accordingly, the ground wire 12 of an un-shown vehicle-mounted device is connected and fixed to the negative terminal of the battery via the ground terminal 10 bolted to the vehicle body panel 26.

With a ground terminal 10 structured in this manner, the piezoelectric element 14 is provided surrounding the bolt insertion holes 44 provided in the two plates 40a and 40b that constitute the connection portion 28. Thus, if a fastened bolt 48 that is inserted into the bolt insertion holes 44 and bolts a ground terminal 10 to a vehicle body panel 26 was to loosen, a gap forms between the bolt 48 and the piezoelectric element 14, and thus the connection portion 28 between the vehicle body panel 26 and the bolt 48 will be displaced as the vehicle vibrates, which results in large changes in the pressure acting on the piezoelectric element 14. Accordingly, when the bolt 48 loosens, large changes in the voltage generated in the piezoelectric element 14 occur due to vibrations in the vehicle, and thus it is possible to reliably detect loosening of the ground terminal 10 by detecting these changes in the voltage. Also, because the piezoelectric element 14 is provided in an annular shape surrounding the bolt insertion holes 44, loosening of the bolt 48 can be detected over a wide range in the entire region surrounding the bolt insertion holes 44. In this way, loosening and floating of the ground terminal 10 can be reliably detected, and thus sensor malfunctions caused by loosening and the like of the ground terminal 10, and major accidents due to sensor malfunctions can be prevented in advance, and the vehicle safety can be improved.

Also, the piezoelectric element 14 is sandwiched between the two plates 40a and 40b that form the connection portion 28 of the ground terminal 10. Accordingly, because a configuration is employed where the piezoelectric element 14 does not come into direct contact with the bolt 48, pressure that acts on the piezoelectric element 14 is prevented from being concentrated at a specific point, and damage to the piezoelectric element 14 can be advantageously avoided. Furthermore, a pair of engaging portions 46 are provided protruding from both sides in the width direction of the end portion of the first plate 40a, and as a result of the engaging portions 46 engaging with both side edge portions in the width direction of the second plate 40b, the two plates 40a and 40b can keep the piezoelectric element 14 in a sandwiched state. Thus, the workability when bolting the connection portion 28 of the ground terminal 10 to the vehicle body panel 26 can be improved. Furthermore, because the rear end side (right end side in FIG. 3) of the second plate 40b to which the engaging portions 46 are engaged is lifted upward and folded into a crank-like shape when seen from side-on, the engaging portions 46 are kept from having an affect on the pressure acting on the piezoelectric element 14.

Also, the two wires 34 extend from the piezoelectric element 14, and the two wires 34 and the ground wire 12 are crimped and fixed by the core line crimping portion 24 and the covering crimping portion 22. Accordingly, the workability when routing the two wires 34 can be improved, and the holdability of the two wires 34 extending from the piezoelectric element 14 can be efficiently increased.

An embodiment of the present invention has thus been described in detail, but the present invention is not limited to that specifically described. For example, in the above-described embodiment, the piezoelectric element 14 was described as being provided annularly around the bolt insertion holes 44, but there is no limit to this, and any shape for the piezoelectric element 14 that allows it to be provided around the bolt insertion holes 44 can be employed, such as a C-shape or a framed polygon. Also, in the above-described embodiment, the piezoelectric element 14 was described as being sandwiched between the two plates 40a and 40b that constitute the connection portion 28, but the piezoelectric element 14 may also be held between a first plate that forms a connection portion 28 and the head of a bolt 48. Furthermore, an example was described in which the ground terminal 10 is a member that is bolted and grounded to the vehicle body panel 26 that is conductively connected to the negative terminal of a battery, but the negative terminal of a battery or a suitable member conductively connected to the negative terminal of a battery can be employed. Additionally, the two wires 34 do not necessarily have to be crimped and fixed by the core wire crimping portion 24 or the coating crimping portion 22. Also, in the above-described embodiment, an example was described in which the piezoelectric element 14 was a so-called monomorph piezoelectric element, which is made of a type of piezoelectric ceramic material, but any known piezoelectric element such as a so-called bi-morph piezoelectric element, which is made of two types of piezoelectric ceramic material, may be employed.

LIST OF REFERENCE NUMERALS

10 Ground terminal
12 Ground wire
14 Piezoelectric element
16 Core wire
24 Core wire crimping portion
26 Vehicle body panel (negative terminal of battery)
28 Connection portion
34 Wire
40a First plate
40b Second plate
44 Bolt insertion hole
46 Engaging portion
48 Bolt

The invention claimed is:
1. A ground terminal configured to be bolted to a ground wire of a vehicle-mounted device to a negative terminal of a battery, the ground terminal comprising:
  a connection portion that has a bolt insertion hole into which a bolt is inserted,
  wherein a piezoelectric element is provided surrounding the bolt insertion hole of the connection portion, the piezoelectric element is sandwiched between two plates that form the connection portion; and wherein a first plate of the two plates is provided with an engaging portion that engages with a second plate of the two plates and holds the piezoelectric element in a sandwiched condition, and wherein the engaging portion is spaced apart from the bolt insertion hole and extends vertically between the two plates.

2. The ground terminal according to claim 1, wherein the piezoelectric element is provided in an annular shape surrounding the bolt insertion hole.

3. The ground terminal according to claim 1, further comprising:

a core wire crimping portion that is crimped and fixed to a core wire of the ground wire, wherein two electrical wires extending from the piezoelectric element and the ground wire are crimped and fixed by the core wire crimping portion.

* * * * *